3,310,325
HANDLE BAR SUPPORT
Herbert J. McCauley, 86 Dana Road,
Buffalo, N.Y. 14216
Filed July 8, 1965, Ser. No. 470,433
4 Claims. (Cl. 287—54.1)

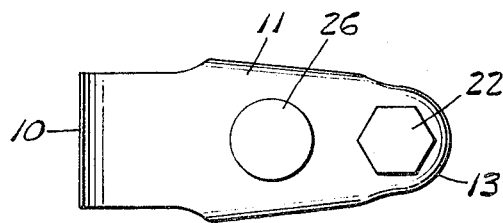
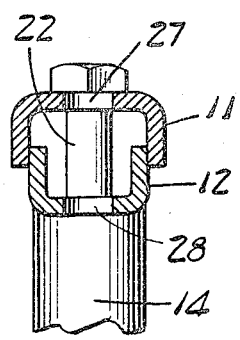
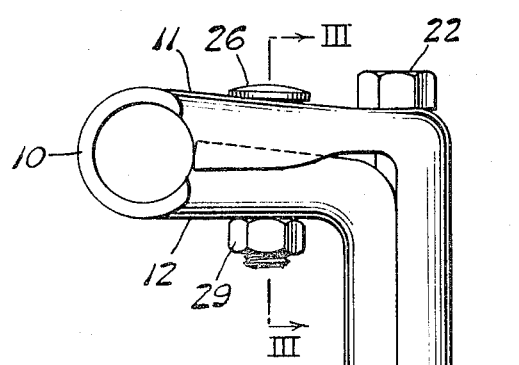
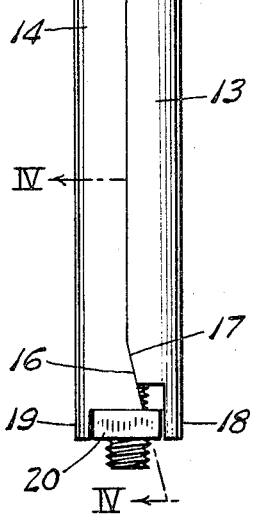

The invention relates to a novel handle bar support for steering posts for bicycles or other velocipedes.

Handle bar supports are a very well-known element in bicycle and velocipede construction and comprise the connections between conventional handle bars and the upper journal of a velocipede fork, which journal bears in the head of the bicycle or velocipede frame. Handle bar supports generally comprise vertically adjustable means for fixing the lower end of the handle bar support in the upper journal of the fork to adjust the height of the handle bar. This is conventionally effected by providing a separate wedge nut or wedge member which is drawn against a beveled lower end of the handle bar support to provide expansion means for fixing the handle bar support at a desired vertical position in the upper journal of the fork.

My prior Patent No. 2,487,661, dated Nov. 8, 1949 shows a handle bar support of this general construction wherein the main body of the support comprises a metal stamping. At the present time the majority of handle bar supports are stamped in the general manner shown in my prior patent and a minor proportion of such supports comprise either forgings or castings. Stamped handle bar supports are generally preferred because of economy of manufacture.

The handle bar support which forms the subject matter of the present invention is of novel construction in that it dispenses with the necessity for a separate wedge nut or other wedging element for spreading or expanding the tubular lower portion of the handle bar support to lock the same in the upper journal of the fork of the bicycle or velocipede. In the handle bar support of the present invention a pair of complemental wedging surfaces are formed integrally with the handle bar support proper in a manner which will appear from a consideration of the following description of a specific example of the handle bar support. In addition to economy of manufacture, the handle bar support of the present invention is easier to handle and apply because of the elimination of a separate loose wedge member. The threading of a special wedge member is also dispensed with since a common standard square nut is employed in conjunction with the usual vertical screw which extends down through the tubular portion of the handle bar support.

A second important phase of novelty of the handle bar support of the present invention resides in the manner in which the elements of the metal stamping comprising the same are formed and arranged. In prior art stamped handle bars, as for instance in my prior aforesaid patent, the usual tubular portion of the handle bar support which extends downwardly into the upper journal of the velocipede fork is formed by bending a portion of the sheet metal blank into full circular form. Such circular formation of the blank portion of relatively heavy sheet metal is difficult and accurate circular formation in this manner in mass production is even more difficult.

In the handle bar support of the present invention the construction of the handle bar support and the method of fabricating the same from sheet metal is different in that an elongated blank is formed so that its central portion forms the handle bar encircling portion while the two opposite ends are bent into generally semi-circular form and then brought together in the further fabrication of the support to comprise a full circular tubular means for insertion in the upper journal of the velocipede fork.

Other objects and advantages of the handle bar support of the present invention and the novel method of fabricating the same will occur to those skilled in the present art upon a consideration of the following specification and the accompanying drawing which set forth a specific mode of practicing the invention. However, it is to be understood that the example thus described in detail is for purposes of illustration only and that the present invention is not limited otherwise than as defined in the appended claims.

In the drawing:

FIG. 1 is a side elevational view of one form of the handle bar support of the present invention;

FIG. 2 is a top plan view thereof;

FIG. 3 is a fragmentary cross-sectional view taken on the line III—III of FIG. 1; and FIG. 4 is a fragmentary view of approximately one-half of a lower portion of the tubular structure of the handle bar support of FIGS. 1 through 3 taken approximately on the line IV—IV of FIG. 1.

Like characters of reference denote like parts in the several figures of the drawing and, referring particularly to FIG. 1, the stamping which forms the handle bar support of the present invention comprises a generally circular formation 10 which is disposed about the handle bar, a pair of interfitting channel portions 11 and 12 which extend from opposite ends of the generally circular or arcuate portion 10, and a further pair of semi-circular channel formations 13 and 14 which extend at right angles from the channel formations 11 and 12, respectively, and abut at their meeting longitudinal edges to form a circular tubular stem formation which fits within the upper journal of a velocipede fork in the usual manner.

Speaking generally, an elongate metal blank of appropriate outline is formed to provide the channel formations 11 and 12 and the semi-circular formations 13 and 14 with the portion 10 thereof still in flat form. The circular formation 10 is then formed which brings the channel formations 11 and 12 into the interfitting formation clearly illustrated in FIG. 3 and brings the semi-circular formations 13 and 14 into abutment as shown in FIG. 1.

It will be noted that the lower end of the semi-circular formation 13 is beveled off as at 16 and that the lower end of semi-circular formation 14 has wedge shaped projections 17 at opposite sides thereof which are complemental to the bevel formations 16 and abut the same as clearly shown in FIG. 1. Furthermore, the semi-circular formations 13 and 14 have depending portions 18 and 19, respectively, which receive a square nut 20 and prevent the same from rotating.

As in prior handle bar support or steering post constructions in bicycles and velocipedes, a screw 22 extends downwardly through the steering post tubular formation 13, 14. In place of the usual special wedge member normally engaged by screw 22, the latter engages the ordinary square nut 20 just described. It will be noted that tightening movement of the screw 22 with respect to nut 20 draws the latter upwardly against the lower ends of the wedge formations 17. It will be noted that wedge formations 17 extend downwardly substantially beyond the bevel portions 16 of the semi-circular portion 13 and accordingly this tightening movement tends to raise the semi-circular portion 14 relative to the semicircular portion 13, both being confined within the hollow upper journal of a velocipede fork. This movement causes a camming action between the wedge formations 17 and the bevel formations 16 which tends to spread the lower ends of the semi-circular formations 13 and 14 causing the same to bind and lock within the upper journal of the velocipede fork. Thus a safe and secure clamping action is obtained without employing any special parts in addition to the handle bar support proper. For tightening the circular portion 10 of the handle bar support on a handle bar the usual stove bolt 26 seats in a square opening 27 formed in the web of channel portion 11, such bolt extending through a clearance hole 28 formed in the web of channel portion 12 to receive a nut 29. A preliminary tightening of the circular portion 10 on the handle bar may be effected in the course of expanding the semi-circular channel formations 13 and 14 by operation of screw 22.

What is claimed is:

1. In a handle bar support for velocipedes and the like, a body member comprising a loop formation for engagement about a handle bar and integral extensions from opposite ends of said loop cooperating to form the remainder of said body member, said extensions comprising portions projecting generally radially from said loop and terminal portions extending angularly from said radial portions to form a stem portion offset from said loop, said radial portions comprising interfitting channel formations and said terminal portions being of generally semi-circular cross section with their longitudinal edges substantially in abutment to form a generally cylindrical stem portion, said abutting longitudinal edges including complemental inclined plane formations, and screw means accessible from the end of said stem portion adjacent to said radial portions and operable to move one of said semi-circular portions axially relative to the other whereby said incline plane formations cooperate to expand said stem portion to secure the same within a member to be controlled by said handle bar.

2. In a handle bar support for velocipedes and the like, a body member comprising a loop formation for engagement about a handle bar and integral extensions from opposite ends of said loop cooperating to form the remainder of said body member, said extensions comprising terminal portions of generally semi-circular cross-section with their longitudinal edges substantially in abutment to form a generally cylindrical stem portion, said abutting longitudinal edges including complemental inclined plane formations, and screw means operable to move one of said semi-circular portions axially relative to the other whereby said incline plane formations cooperate to expand said stem portion to secure the same within a member to be controlled by said handle bar.

3. In a handle bar support for velocipedes and the like, a body member comprising a loop formation for engagement about a handle bar and integral extensions from opposite ends of said loop cooperating to form the remainder of said body member, said extensions comprising upper and lower portions projecting generally outwardly from said loop and terminal portions extending downwardly to form a stem portion offset from said loop, said terminal portions being of generally semi-circular cross section with their longitudinal edges substantially in abutment to form a generally cylindrical stem portion, said abutting longitudinal edges including complemental inclined plane formations, and screw means extending downwardly through said upper projecting portion and engageable with the terminal portion of the lower projecting portion to move said terminal portion upwardly relative to the other terminal portion whereby said incline plane formations cooperate to expand said stem portion to secure the same within a member to be controlled by said handle bar.

4. In a handle bar support for velocipedes and the like, a body member comprising a loop formation for engagement about a handle bar and integral extensions from opposite ends of said loop cooperating to form the remainder of said body member, said extensions comprising upper and lower portions projecting generally outwardly from said loop and terminal portions extending downwardly to form a stem portion offset from said loop, said terminal portions including cooperating cam formations, and screw means extending downwardly through said upper projecting portion and engageable with the terminal portion of the lower projecting portion to move said terminal portion upwardly relative to the other terminal portion whereby said cam formations cooperate to expand said stem portion to secure the same within a member to be controlled by said handle bar.

References Cited by the Examiner

UNITED STATES PATENTS

| | | | |
|---|---|---|---|
| 650,393 | 5/1900 | Holahan | 287—124 |
| 1,913,459 | 6/1933 | Skillman et al. | 29—463 X |
| 2,430,524 | 11/1947 | Miller. | |
| 2,487,661 | 11/1949 | McCauley | 74—551.6 |
| 2,505,648 | 5/1950 | Pawsat | 287—52.02 |

KENNETH H. BETTS, *Primary Examiner.*